(12) United States Patent
Lee et al.

(10) Patent No.: US 11,724,338 B2
(45) Date of Patent: Aug. 15, 2023

(54) HOT-STAMPED ARTICLE USING A TAILOR WELDED BLANK METHOD AND A METHOD OF MANUFACTURING THE SAME

(71) Applicants: HYUNDAI MOTOR COMPANY, Seoul (KR); KIA CORPORATION, Seoul (KR)

(72) Inventors: Chang Wook Lee, Anyang-si (KR); Yeon Jung Hwang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/246,214

(22) Filed: Apr. 30, 2021

(65) Prior Publication Data

US 2022/0161360 A1    May 26, 2022

(30) Foreign Application Priority Data

Nov. 24, 2020    (KR) .................. 10-2020-0158812

(51) Int. Cl.
*B23K 26/21*      (2014.01)
*C22C 38/38*      (2006.01)
(Continued)

(52) U.S. Cl.
CPC ............ *B23K 26/21* (2015.10); *B21D 22/022* (2013.01); *C21D 6/002* (2013.01); *C21D 6/005* (2013.01);
(Continued)

(58) Field of Classification Search
CPC .... B23K 26/21; B21D 22/022; C22C 38/002; C22C 38/02; C22C 38/32; C22C 38/38
(Continued)

(56) References Cited

U.S. PATENT DOCUMENTS 9,381,720 B2    7/2016    Kwon et al.
9,884,468 B2    2/2018    Kwon et al.
(Continued)

FOREIGN PATENT DOCUMENTS

CN    106350741 A    1/2017
JP    2014024074 A  *  2/2014
(Continued)

OTHER PUBLICATIONS

Fujimoto et al., JP-2014024074-A machine translation, Feb. 5, 2014, entire translation (Year: 2014).*

*Primary Examiner* — Humera N. Sheikh
*Assistant Examiner* — Katherine A Christy
(74) *Attorney, Agent, or Firm* — Lempia Summerfield Katz LLC (57) ABSTRACT

A hot-stamped article and method of manufacturing same use a tailor welded blank (TWB) method capable of controlling the microstructure of a weld portion to prevent fracture of the weld portion. The hot-stamped article is manufactured by welding a first sheet and a second sheet made of different kinds of materials to each other using the TWB method and hot-stamping a welded sheet. The first sheet and the second sheet have different upper austenite transformation temperatures (A3 temperatures), the first sheet and the second sheet are welded to each other via a weld portion, each of the first sheet and the weld portion has a composite structure comprising ferrite, bainite, and martensite, and the second sheet has a martensite structure.

4 Claims, 7 Drawing Sheets

(51) Int. Cl.
    *C22C 38/32*     (2006.01)
    *C22C 38/02*     (2006.01)
    *C22C 38/00*     (2006.01)
    *B21D 22/02*     (2006.01)
    *C21D 9/46*     (2006.01)
    *C21D 6/00*     (2006.01)

(52) U.S. Cl.
    CPC .............. *C21D 6/008* (2013.01); *C21D 9/46* (2013.01); *C22C 38/002* (2013.01); *C22C 38/02* (2013.01); *C22C 38/32* (2013.01); *C22C 38/38* (2013.01); *C21D 2211/002* (2013.01); *C21D 2211/005* (2013.01); *C21D 2211/008* (2013.01)

(58) Field of Classification Search
    USPC ........................................................ 428/683
    See application file for complete search history.

(56) References Cited

U.S. PATENT DOCUMENTS

| | | |
|---|---|---|
| 2012/0279621 A1 | 11/2012 | Gerber et al. |
| 2014/0154521 A1 | 6/2014 | Kwon et al. |
| 2015/0165726 A1 | 6/2015 | Kwon et al. |
| 2016/0010171 A1* | 1/2016 | Naitou .................. C21D 6/002 148/333 |

FOREIGN PATENT DOCUMENTS

| | | |
|---|---|---|
| JP | 5971004 B2 | 8/2016 |
| KR | 20130014520 A | 2/2013 |
| KR | 101448473 B1 | 10/2014 |

* cited by examiner

HOT-STAMPED ARTICLE USING A TAILOR WELDED BLANK METHOD AND A METHOD OF MANUFACTURING THE SAME

CROSS-REFERENCE TO RELATED APPLICATION

This application claims the benefit of and priority to Korean Patent Application No. 10-2020-0158812, filed on Nov. 24, 2020, with the Korean Intellectual Property Office, the disclosure of which is herein incorporated by reference in its entirety.

BACKGROUND OF THE DISCLOSURE

1. Field of the Disclosure

The present disclosure relates to a hot-stamped article using a tailor welded blank (TWB) method and a method of manufacturing the same, and more particularly to a hot-stamped article using a TWB method capable of controlling the microstructure of a weld portion to prevent fracture of the weld portion and a method of manufacturing the same.

2. Description of the Related Art

In general, a sheet using a tailor welded blank (TWB) method, which is a welded sheet formed as the result of two different kinds of materials having different strengths and thicknesses being welded to each other, is variously used as a vehicle part, since it is possible to achieve light weight and to reduce the number of parts.

Meanwhile, a hot stamping method, which is a method of heating a sheet to a high temperature, pressing the sheet using a press having a coolant flowing therein, while cooling the sheet to shape the sheet, is used as a method of shaping various vehicle parts, since it is possible to perform complex shaping and to secure high dimensional precision and high strength.

In recent years, therefore, the TWB method and the hot stamping method have been simultaneously used to manufacture vehicle parts.

In general, when the TWB method and the hot stamping method are simultaneously used, a weld portion between sheets welded to each other using the TWB method includes a heat affected zone (HAZ) and a weld zone (Weld). When heat treatment for hot stamping is performed in this state, the heat affected zone and a weld zone are heat-treated at the upper austenite transformation temperature (A3 temperature) or higher, whereby both are transformed into full austenite, and are finally transformed into martensite due to cooling at the time of hot stamping. The weld zone already has a fine martensite structure before heat treatment for hot stamping, is reversely transformed into austenite and is then transformed into martensite again through heat treatment for hot stamping. As a result, the weld zone has a finer martensite structure than the martensite structure of the raw material.

Since the weld zone has higher hardness than the periphery thereof, therefore, external stress is concentrated on the weld zone, whereby the weld portion is frequently fractured.

The matters disclosed in this section are merely to enhance understanding of the general background of the disclosure and should not be taken as an acknowledgment or any form of suggestion that the matters form the related art already known to a person skilled in the art.

SUMMARY OF THE DISCLOSURE

It is an object of the present disclosure to provide a hot-stamped article using a tailor welded blank (TWB) method capable of controlling the microstructure of a weld portion by adjusting ingredients of different kinds of sheets welded to each other using the TWB method to prevent fracture of the weld portion and a method of manufacturing the same.

In accordance with an aspect of the present disclosure, the above and other objects can be accomplished by the provision of a hot-stamped article. The hot stamped article is manufactured by welding a first sheet and a second sheet made of different kinds of materials to each other using a TWB method and hot-stamping a welded sheet. The first sheet and the second sheet have different upper austenite transformation temperatures (A3 temperatures), the first sheet and the second sheet are welded to each other via a weld portion, each of the first sheet and the weld portion has a composite structure including ferrite, bainite, and martensite, and the second sheet has a martensite structure.

The first sheet may include: 0.04 to 0.12 wt % of carbon (C); 0.80 wt % or less of silicon (Si); 1.60 to 2.00 wt % of manganese (Mn); 0.030 wt % or less of phosphorus (P); 0.015 wt % or less of sulfur (S); 0.10 to 0.60 wt % of chromium (Cr); 0.0008 to 0.0050 wt % of boron (B); and the remaining wt % of iron (Fe) and other inevitable impurities. The second sheet may include: 0.27 to 0.33 wt % of C; 0.40 wt % or less of Si; 1.10 to 1.60 wt % of Mn; 0.030 wt % or less of P; 0.015 wt % or less of S; 0.10 to 0.60 wt % of Cr; 0.0008 to 0.0050 wt % of B; and the remaining wt % of Fe and other inevitable impurities.

The first sheet may have a hardness of 200 to 350 Vickers Pyramid Number (HV), the weld portion may have a hardness of 350 to 550 HV, and the second sheet may have a hardness of 550 to 650 HV.

At the time of hot stamping, the first sheet, the weld portion, and the second sheet may be heated within a temperature range between the A3 temperature of the first sheet and the A3 temperature of the second sheet.

Each of the first sheet and the weld portion may have a structure including 30% or less of martensite.

Each of the first sheet and the weld portion may have a composite structure including 10 to 50% of ferrite, 10 to 50% of bainite, and 30% or less of martensite.

In accordance with another aspect of the present disclosure, there is provided a method of manufacturing a hot-stamped article. The method includes: a preparation step of preparing a first sheet and a second sheet having different A3 temperatures; a welding step of welding the first sheet and the second sheet using a TWB method to prepare a welded sheet obtained as the result of the first sheet and the second sheet being welded to each other via a weld portion; and a hot-stamping step of hot-stamping the welded sheet heated within a temperature range between the A3 temperature of the first sheet and the A3 temperature of the second sheet.

In the preparation step, a sheet may be prepared as the first sheet and include: 0.04 to 0.12 wt % of C; 0.80 wt % or less of Si; 1.60 to 2.00 wt % of Mn; 0.030 wt % or less of P; 0.015 wt % or less of S; 0.10 to 0.60 wt % of Cr; 0.0008 to 0.0050 wt % of B; and the remaining wt % of Fe and other inevitable impurities. A sheet may also be prepared as the second sheet and include: 0.27 to 0.33 wt % of C; 0.40 wt % or less of Si; 1.10 to 1.60 wt % of Mn; 0.030 wt % or less of P; 0.015 wt % or less of S; 0.10 to 0.60 wt % of Cr; 0.0008 to 0.0050 wt % of B; and the remaining wt % of Fe and other inevitable impurities.

The welded sheet may be heated to 810 to 880° C. in the hot-stamping step.

After the hot-stamping step, each of the first sheet and the weld portion of the hot-stamped article may have a composite structure including ferrite, bainite, and martensite, and the second sheet of the hot-stamped article may have a martensite structure.

After the hot-stamping step, each of the first sheet and the weld portion may have a structure including 30% or less of martensite.

After the hot-stamping step, each of the first sheet and the weld portion may have a composite structure including 10 to 50% of ferrite, 10 to 50% of bainite, and 30% or less of martensite.

After the hot-stamping step, the first sheet of the hot-stamped article may have a hardness of 200 to 350 HV, the weld portion of the hot-stamped article may have a hardness of 350 to 550 HV, and the second sheet of the hot-stamped article may have a hardness of 550 to 650 HV.

BRIEF DESCRIPTION OF THE DRAWINGS

The above and other objects, features and other advantages of the present disclosure should be more clearly understood from the following detailed description taken in conjunction with the accompanying drawings, in which.

DETAILED DESCRIPTION OF THE PREFERRED EMBODIMENTS

Hereinafter, embodiments of the present disclosure are described in detail with reference to the accompanying drawings. However, the present invention is not limited to the embodiments disclosed below and may be implemented in various different forms. The embodiments herein are provided to make the disclosure of the present disclosure complete and to fully convey the scope of the disclosure to those skilled in the art.

The present disclosure relates to a hot-stamped article manufactured by welding a first sheet and a second sheet made of different kinds of materials to each other using a tailor welded blank (TWB) method and hot-stamping a welded sheet and a method of manufacturing the same. Ingredients of the first sheet and the second sheet and a heat treatment temperature for hot stamping are controlled in order to control the microstructure of a weld portion formed as the result of the first sheet and the second sheet being welded at the time of welding using the TWB method.

Preferably, a hot-stamped article using the TWB method according to an embodiment of the present disclosure is formed by welding a first sheet and a second sheet, which are different kinds of sheets, to each other using the TWB method. The first sheet and the second sheet are welded to each other via a weld portion and heat-treated and hot-stamped.

At this time, the structure of the weld portion is formed as a composite structure including ferrite, bainite, and martensite. In the case in which the structure of the weld portion is formed as a composite structure, as described above, external stress is not locally concentrated on the weld portion but is dispersed over the entire sheets, whereby fracture of the weld portion is prevented.

Next, a method of manufacturing a hot-stamped article having the structure described above is described.

A method of manufacturing a hot-stamped article according to an embodiment of the present disclosure includes: a preparation step of preparing a first sheet and a second sheet having different upper austenite transformation temperatures (A3 temperatures); a welding step of welding the first sheet and the second sheet using the TWB method to prepare a welded sheet obtained as the result of the first sheet and the second sheet being welded to each other via a weld portion; and a hot-stamping step of hot-stamping the welded sheet heated within a temperature range between the A3 temperature of the first sheet and the A3 temperature of the second sheet.

The preparation step is a step of preparing a first sheet and a second sheet having different A3 temperatures. For example, ingredients of the first sheet are adjusted such that the first sheet has an A3 temperature of 880° C., and ingredients of the second sheet are adjusted such that the first sheet has an A3 temperature of 810° C.

In other words, a sheet is used as a first sheet, which includes: 0.04 to 0.12 wt % of C; 0.80 wt % or less of Si; 1.60 to 2.00 wt % of Mn; 0.030 wt % or less of P; 0.015 wt % or less of S; 0.10 to 0.60 wt % of Cr; 0.0008 to 0.0050 wt % of B; and the remaining wt % of Fe and other inevitable impurities.

In addition, a sheet is used as the second sheet, which includes: 0.27 to 0.33 wt % of C; 0.40 wt % or less of Si; 1.10 to 1.60 wt % of Mn; 0.030 wt % or less of P; 0.015 wt % or less of S; 0.10 to 0.60 wt % of Cr; 0.0008 to 0.0050 wt % of B; and the remaining wt % of Fe and other inevitable impurities.

The welding step is a step of welding the prepared first and second sheets to each other using the TWB method. The first sheet and the second sheet are welded to prepare a welded sheet obtained as the result of the first sheet and the second sheet being welded to each other via a weld portion.

When the first sheet and the second sheet, the ingredients of each of which are adjusted, are welded to each other using the TWB method, the ingredients of the first sheet and the second sheet are mixed with each other in the weld portion. The A3 temperature of the weld portion is adjusted to a range of 810 to 880° C.

The hot-stamping step is a step of hot-stamping the heated welded sheet.

At the time of heat treatment before hot stamping, a heat treatment temperature is maintained, in one example, within a range of 810 to 880° C. in order to form a composite structure in the weld portion at the time of hot stamping.

As a result, the second sheet is heat-treated at the A3 temperature or higher, whereby the second sheet is transformed into full austenite. The second sheet is cooled at the time of hot stamping, whereby the second sheet is transformed into full martensite.

However, the first sheet is heat-treated at the A3 temperature or lower, whereby the first sheet is not transformed into full austenite. Also, the weld portion, in which the ingredients of the first sheet and the second sheet are mixed with each other, is not transformed into full austenite. As a result, each of the first sheet and the weld portion has a composite structure including ferrite, bainite, and martensite due to rapid cooling at the time of hot stamping.

Meanwhile, in the case in which the first sheet and the second sheet having the above composition are used, and the heat-treatment temperature is maintained within 810 to 880° C. in the hot-stamping step, the second sheet has a full martensite structure, and each of the first sheet and the weld portion has a composite structure including 10 to 50% of ferrite, 10 to 50% of bainite, and 30% or less of martensite.

As the result of formation of the structures described above, the first sheet has a hardness of 200 to 350 Vickers Pyramid Number (HV), the weld portion has a hardness of 350 to 550 HV, and the second sheet has a hardness of 550 to 650 HV.

Next, the present disclosure is described based on a Comparative Example and an Example according to the present disclosure (i.e., the Example).

In the Comparative Example, a first comparative sheet having a 100K-class tensile strength value and a second comparative sheet having a 150K-class tensile strength value are prepared using a conventional, commonly used steel grade. These comparative sheets are welded to each other using the TWB method.

Ingredients of the first comparative sheet and the second comparative sheet are shown in Table 1.

TABLE 1

| Classification | C | Si | Mn | P | S | Cr | B | A3 temperature (° C.) |
|---|---|---|---|---|---|---|---|---|
| First comparative sheet | 0.057 | 0.53 | 1.86 | 0.013 | 0.001 | 0.20 | 0.0023 | 880 |
| Second comparative sheet | 0.23 | 0.26 | 1.22 | 0.009 | 0.002 | 0.19 | 0.0044 | 850 |

A welded sheet obtained as the result of the first comparative sheet and the second comparative sheet being welded to each other is heat-treated at 930° C. and is then hot-stamped.

At this time, the microstructures of a weld portion and the periphery thereof before and after hot stamping were observed, and the hardness of each area was measured. The results are shown in FIGS. 1A and 1B.

Figure 1A:
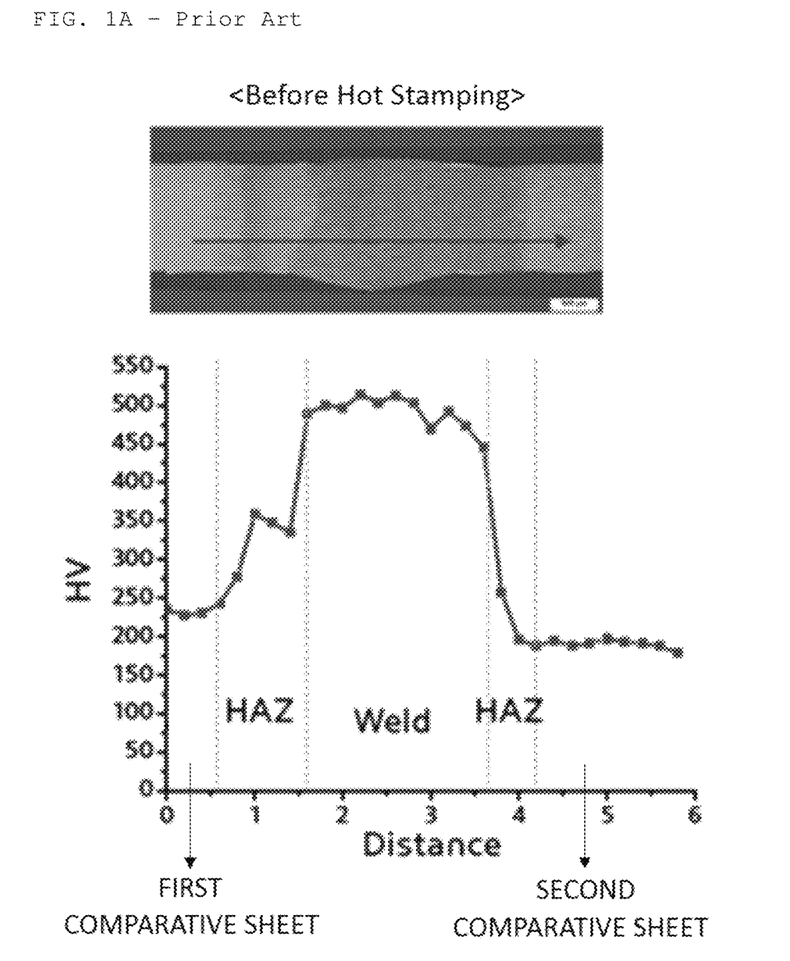
FIG. 1A shows the results of observation of the microstructure of a Comparative Example and the hardness values thereof before hot stamping.

FIG. 1A shows the results of observation of the microstructure and the hardness values thereof before hot stamping. FIG. 1B shows the results of observation of the microstructure and the hardness values thereof after hot stamping.

Figure 1B:
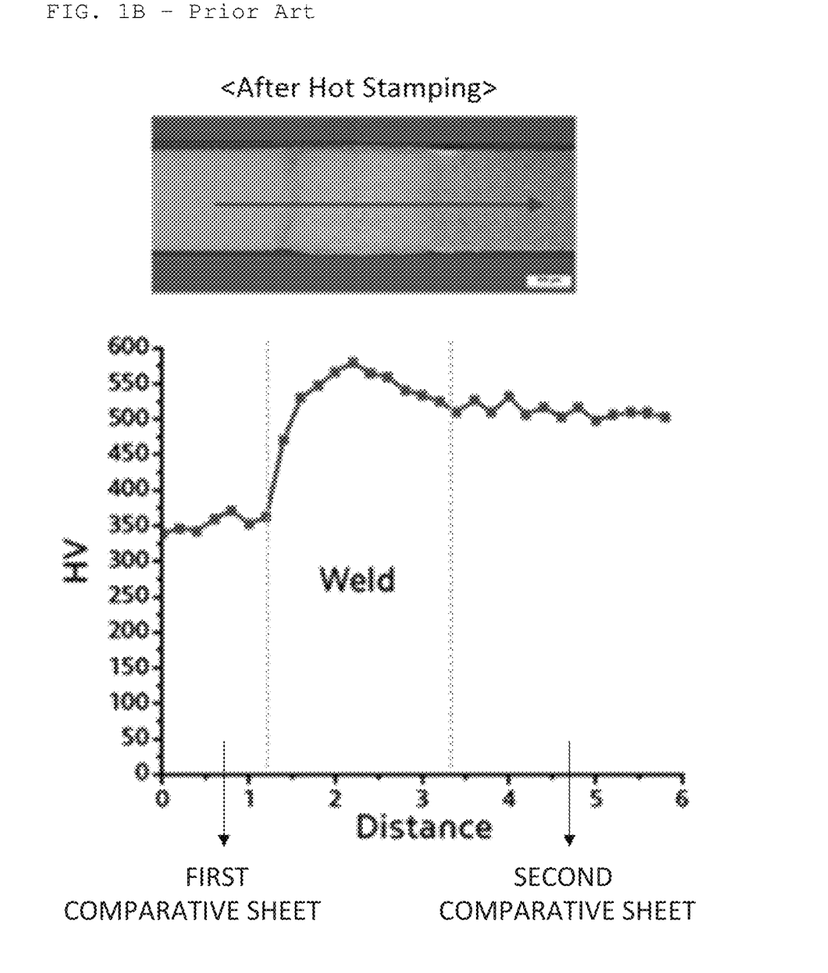
FIG. 1B shows the results of observation of the microstructure of a Comparative Example and the hardness values thereof after hot stamping.

As can be seen from FIGS. 1A and 1B, the Comparative Example is heat-treated at a temperature higher than the A3 temperatures of the first comparative sheet and the second comparative sheet. Each of the first comparative sheet, the second comparative sheet, and the weld portion is thereby transformed into full austenite. At the time of rapid cooling due to hot stamping, the second comparative sheet has a full martensite structure, and the first comparative sheet has a martensite structure and partially a bainite structure. The weld portion has a full martensite structure.

As a result, as shown in FIG. 1B, it can be seen that the hardness of the weld portion is higher than the hardness of the first comparative sheet and the hardness of the second comparative sheet. This result may reveal that external stress is concentrated on the weld portion, whereby there is a high probability of the weld portion fracturing.

In the Example, on the other hand, a first sheet identical to the first comparative sheet having a 100K-class tensile strength value, which is a conventional, commonly used steel grade, is prepared. A second sheet having higher contents of carbon (C) and manganese (Mn) than in the second comparative sheet so as to have an A3 temperature of 810° C. is also prepared. These sheets are welded to each other using the TWB method.

Ingredients of the first sheet and the second sheet are shown in Table 2.

TABLE 2

| Classification | C | Si | Mn | P | S | Cr | B | A3 temperature (° C.) |
|---|---|---|---|---|---|---|---|---|
| First sheet | 0.057 | 0.53 | 1.86 | 0.013 | 0.001 | 0.20 | 0.0023 | 880 |
| Second sheet | 0.31 | 0.22 | 1.4 | 0.013 | 0.002 | 0.2 | 0.0026 | 810 |

A welded sheet obtained as the result of the first sheet and the second sheet being welded to each other is heat-treated at 810 to 880° C. and is then hot-stamped.

At this time, the microstructures of a weld portion and the periphery thereof before and after hot stamping were observed, and the hardness of each area was measured. The results are shown in FIGS. 2A and 2B.

Figure 2A:
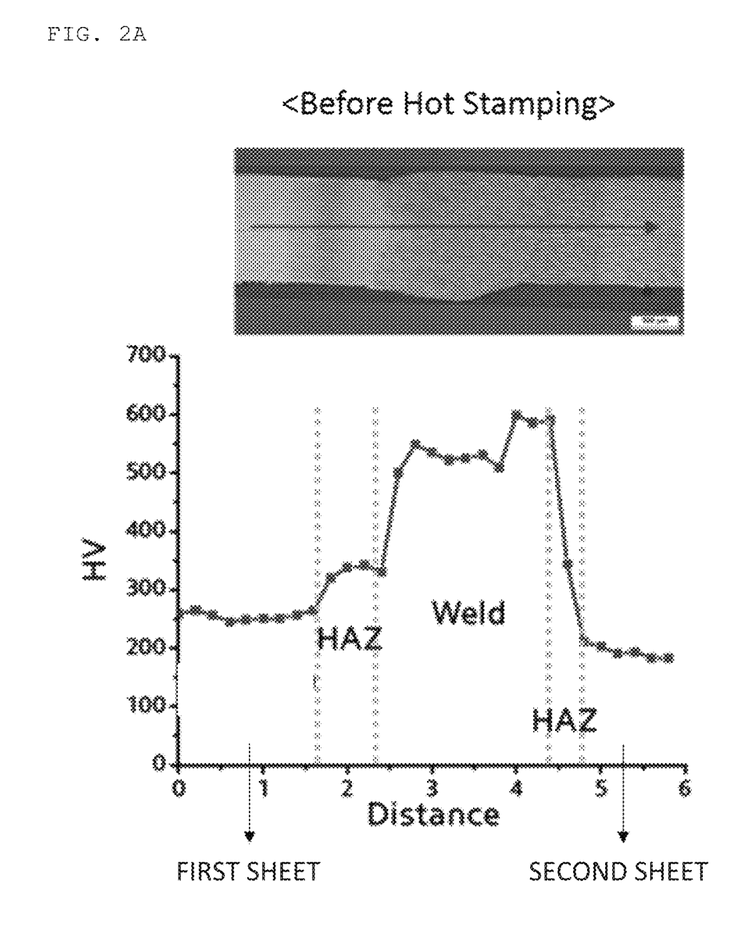
FIG. 2A shows the results of observation of the microstructure of an Example of the present disclosure and the hardness values thereof before hot stamping.

FIG. 2A shows the results of observation of the microstructure and the hardness values thereof before hot stamping. FIG. 2B shows the results of observation of the microstructure and the hardness values thereof after hot stamping.

Figure 3:
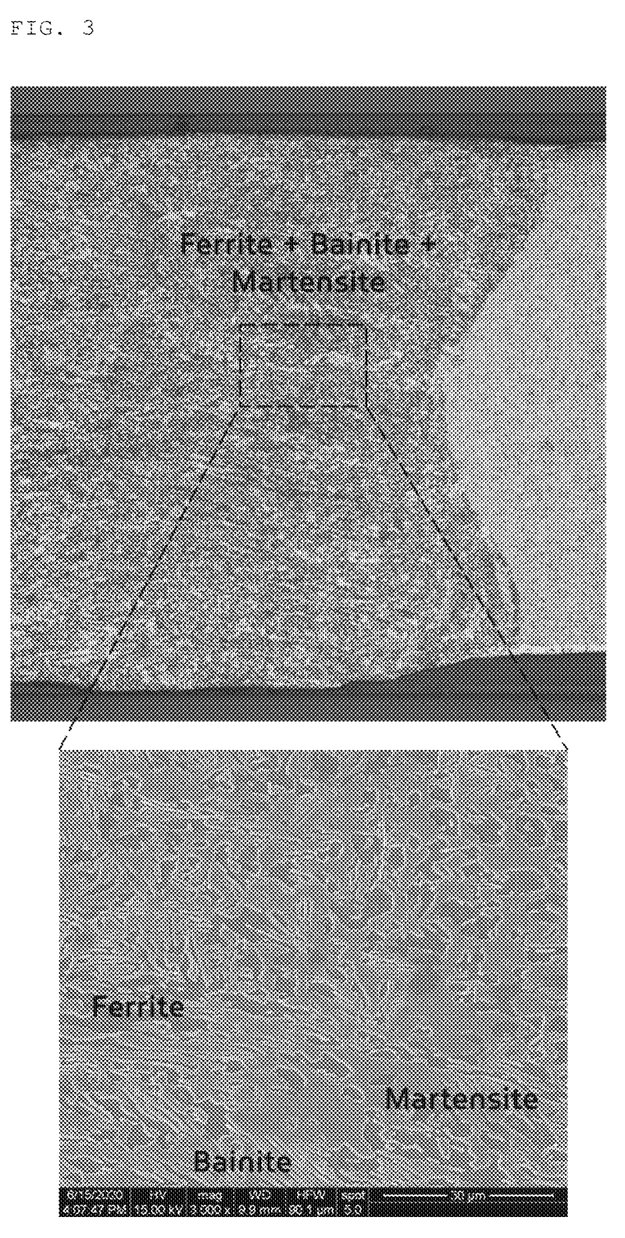
FIG. 3 shows the results of magnified observation of the microstructure of an Example of the present disclosure after hot stamping.

The microstructure of the weld portion after hot stamping was observed in a magnified state. The results are shown in FIG. 3.

Figure 2B:
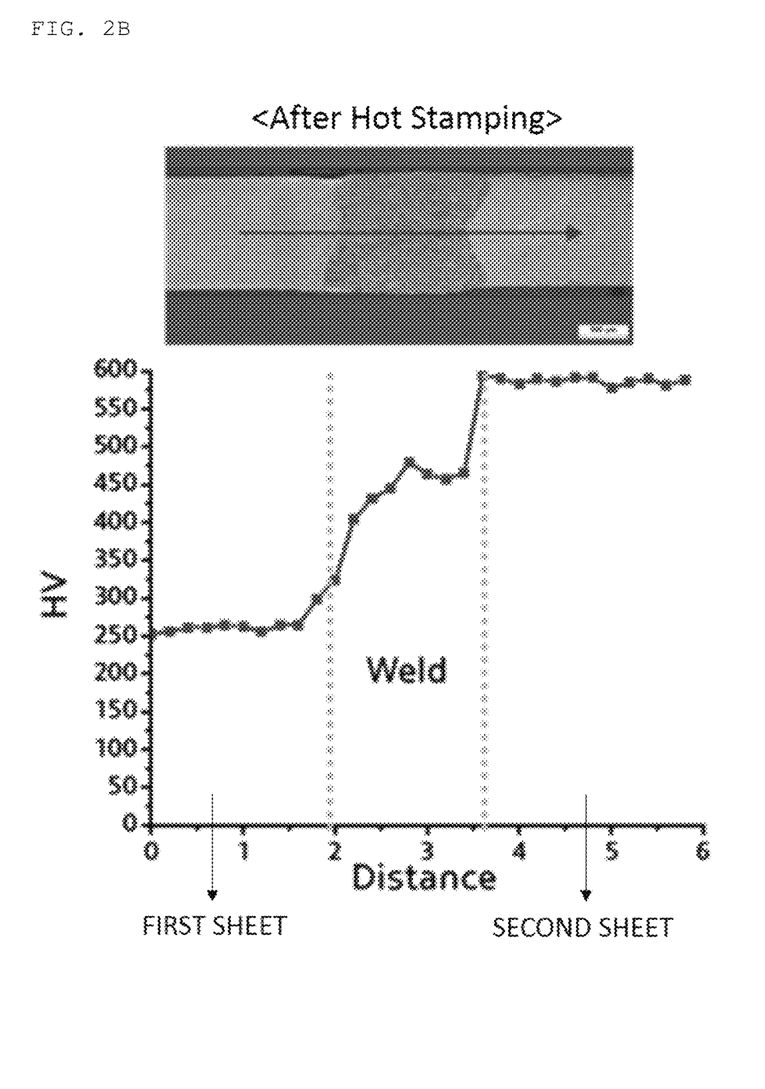
FIG. 2B shows the results of observation of the microstructure of an Example of the present disclosure and the hardness values thereof after hot stamping.

As can be seen from FIGS. 2A and 2B, the Example is heat-treated at a temperature between the A3 temperature of the first sheet and the A3 temperature of the second sheet, whereby the second sheet is transformed into full austenite. At the time of rapid cooling due to hot stamping, the second sheet has a full martensite structure. However, each of the first sheet and the weld portion is not transformed into full austenite at the time of heat treatment. At the time of rapid cooling due to hot stamping, therefore, each of the first sheet and the weld portion has a composite structure including ferrite, bainite, and martensite, although the second sheet has a full martensite structure. These results can be confirmed from FIG. 3.

As a result, as shown in FIG. 2B, it can be seen that the hardness of the weld portion is between the hardness of the first sheet and the hardness of the second sheet. This result may reveal that external stress is prevented from being concentrated on the weld portion, whereby there is a low probability of the weld portion being fractured.

Next, experiments were performed in order to observe a change in A3 temperature of the weld portion based on carbon (C) content of the first sheet and a change in microstructure thereof due thereto.

In the Comparative Example, the first sheet and the second sheet of Table 2 were used, wherein carbon (C) content of the first sheet was adjusted to 0.2 wt %. In the Comparative Example, the first sheet and the second sheet of Table 2 were used, wherein carbon (C) content of the first sheet was adjusted to 0.05 wt %.

The formation of a microstructure of a weld portion was simulated under the conditions that the first sheet and the second sheet were welded to each other using the TWB method to prepare a welded sheet and the welded sheet was heat-treated at 810 to 880° C.

Figure 4A:
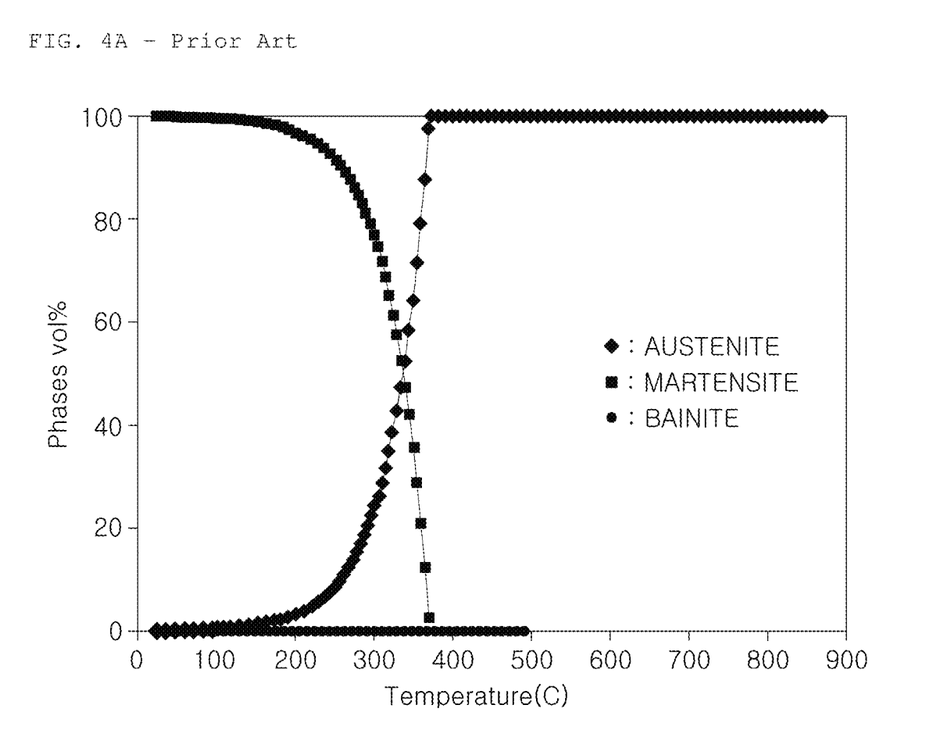
FIG. 4A shows the results of formation of the microstructure of a weld portion according to a Comparative Example based on heat treatment temperature.
Figure 4B:
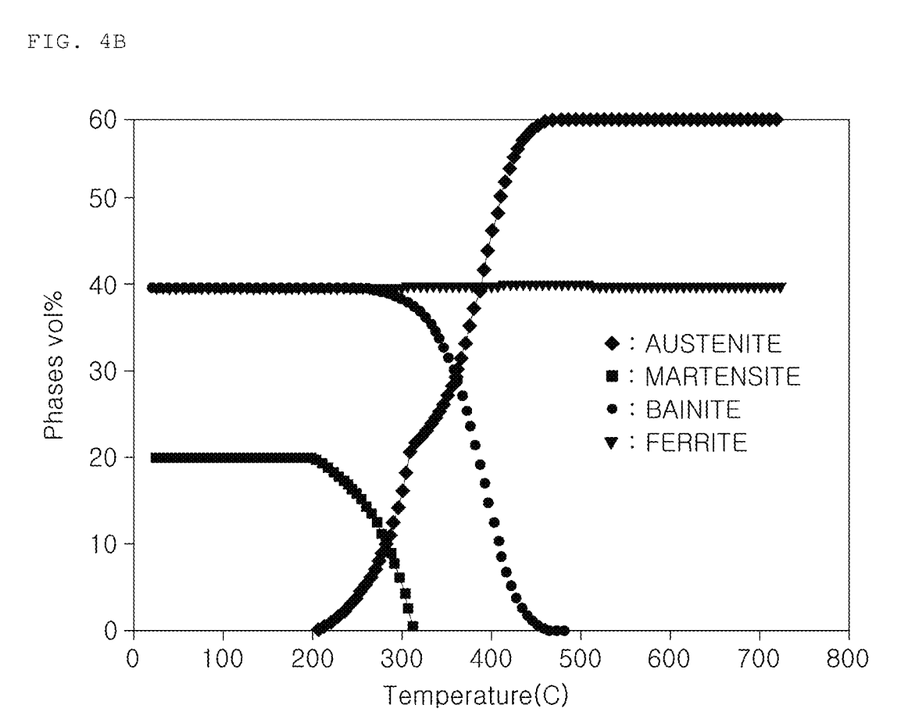
FIG. 4B shows the results of formation of the microstructure of a weld portion according to an Example of the present disclosure based on heat treatment temperature.

The simulation results are shown in FIGS. 4A and 4B.

FIG. 4A shows the results of formation of the microstructure of the weld portion according to the Comparative Example based on heat treatment temperature. FIG. 4B shows the results of formation of the microstructure of the weld portion according to Example based on heat treatment temperature.

As can be seen from FIG. 4A, in the case in which carbon (C) content of the first sheet exceeded the range presented in the present disclosure, the A3 temperature of the weld portion was lower than a range of 810 to 880° C., which is a heat treatment temperature range. As a result, the weld portion was transformed into full austenite during heat treatment and a full martensite structure was formed at the time of rapid cooling due to hot stamping.

As can be seen from FIG. 4B, on the other hand, in the case in which carbon (C) content of the first sheet was within the range presented in the present disclosure, the A3 temperature of the weld portion was adjusted to a range of 810 to 880° C., which is a heat treatment temperature range. As a result, the weld portion was not transformed into full austenite and was partially ferrite during heat treatment, and a composite structure including ferrite, bainite, and martensite was formed at the time of rapid cooling due to hot stamping.

As is apparent from the above description, according to an embodiment of the present disclosure, ingredients of different kinds of sheets welded to each other using a TWB method are adjusted to adjust the A3 temperature of a weld portion in which the ingredients of different kinds of sheets are mixed with each other. Temperature is also controlled at the time of heat treatment for hot stamping. It is thereby possible to form a composite structure including ferrite, bainite, and martensite in the weld portion after hot stamping.

Consequently, external stress is prevented from being concentrated on the weld portion, whereby fracture of the weld portion is prevented.

Although the disclosed embodiments of the present disclosure have been described above with reference to the accompanying drawings, those having ordinary skill in the art should appreciate that the present disclosure can be implemented in various other embodiments without changing the technical ideas or features thereof.

What is claimed is:

1. A hot-stamped article comprising:
   a first sheet;
   a second sheet welded to the first sheet, the second sheet having an upper austenite transformation (A3) temperature different from that of the first sheet; and
   a weld portion positioned between the first sheet and the second sheet where the first sheet and the second sheet are welded,
   wherein both the first sheet and the weld portion individually have a composite structure comprising 10-50% of ferrite, 10-50% of bainite, and 30% or less of martensite,
   wherein the second sheet has a martensite structure,
   wherein the first sheet has a composition comprising 0.04 to 0.12 wt % of carbon (C), 0.80 wt % or less of silicon (Si), 1.60 to 2.00 wt % of manganese (Mn), 0.030 wt % or less of phosphorus (P), 0.015 wt % or less of sulfur (S), 0.10 to 0.60 wt % of chromium (Cr), 0.0008 to 0.0050 wt % of boron (B), and a remaining wt % of iron (Fe) and other inevitable impurities, and
   wherein the second sheet has a composition comprising 0.27 to 0.33 wt % of C, 0.40 wt % or less of Si, 1.10 to 1.60 wt % of Mn, 0.030 wt % or less of P, 0.015 wt % or less of S, 0.10 to 0.60 wt % of Cr, 0.0008 to 0.0050 wt % of B, and a remaining wt % of Fe and other inevitable impurities.

2. The hot-stamped article of claim 1, wherein the first sheet has a hardness in a range of 200 to 350 Vickers Pyramid Number (HV), wherein the weld portion has a hardness in a range of 350 to 550 HV, and wherein the second sheet has a hardness in a range of 550 to 650 HV.

3. The hot-stamped article of claim 1, wherein, during hot stamping, the first sheet, the weld portion, and the second sheet are heated within a temperature range between an A3 temperature of the first sheet and an A3 temperature of the second sheet.

4. The hot-stamped article of claim 1, wherein the weld portion is defined as a volume between the first sheet and the second sheet where the composition of the first sheet is mixed with the composition of the second sheet.

\* \* \* \* \*